United States Patent [19]
Nelson, Jr.

[11] 3,982,313
[45] Sept. 28, 1976

[54] METHOD FOR AUTOMATICALLY FASTENING DECK BOARDS TO STRINGERS

[76] Inventor: William B. Nelson, Jr., 125 Sunset Drive, West Monroe, La. 71291

[22] Filed: Jan. 8, 1976

[21] Appl. No.: 648,033

Related U.S. Application Data

[62] Division of Ser. No. 538,910, Jan. 6, 1975, Pat. No. 3,957,191.

[52] U.S. Cl. .................................. 29/432; 29/208 R
[51] Int. Cl.[2] .......................................... B23P 11/00
[58] Field of Search ............... 29/432, 432.1, 208 R; 227/7, 17, 39, 44, 45, 48, 50, 99, 100, 101

[56] References Cited

UNITED STATES PATENTS

| | | | |
|---|---|---|---|
| 3,628,714 | 12/1971 | Offenwanger | 227/100 X |
| 3,629,931 | 12/1971 | Stanley | 29/432 |
| 3,755,871 | 9/1973 | Nelson, Jr. | 29/208 R X |
| 3.765,587 | 10/1973 | Davis | 227/100 |
| 3,822,815 | 7/1974 | Davis | 227/100 X |

*Primary Examiner*—Victor A. DiPalma
*Attorney, Agent, or Firm*—Norvell E. Von Behren

[57] ABSTRACT

An automatic fastening system and method is disclosed for use in fastening deck boards to stringers in a pallet-making machine or the like. The automatic fastening system of the preferred embodiment comprises an adjustable frame having a plurality of staple guns pivotably mounted on the frame and has automatic positioning means, in the form of a wheel, associated with each staple gun for positioning the staple guns by automatically raising and lowering the staple guns as the height of the pallet deck board changes and as the height of the pallet structure changes depending upon whether or not stringer-type pallets or block-type pallets are being manufactured. Also disclosed is an automatic firing pneumatic circuit for the subject fastening system and a method for automatically fastening a plurality of deck boards to a plurality of stringers.

12 Claims, 17 Drawing Figures

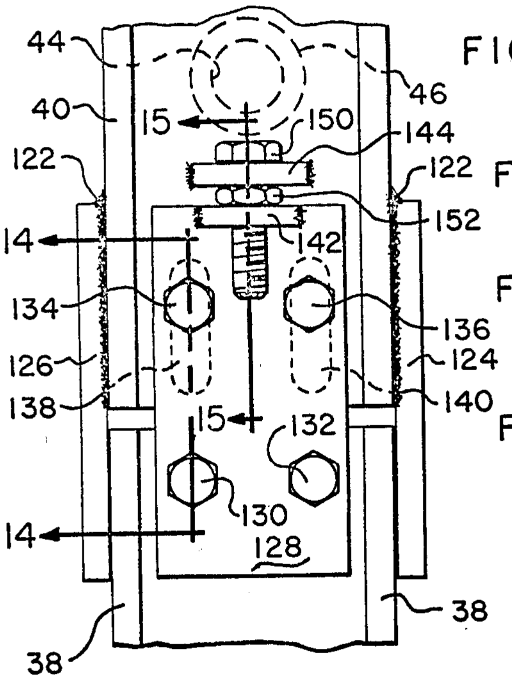
FIG. 12
FIG. 2
FIG. 3
FIG. 4
FIG. 5
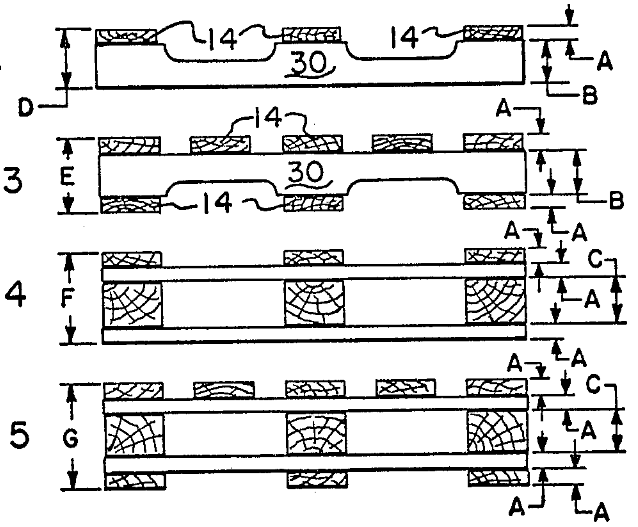
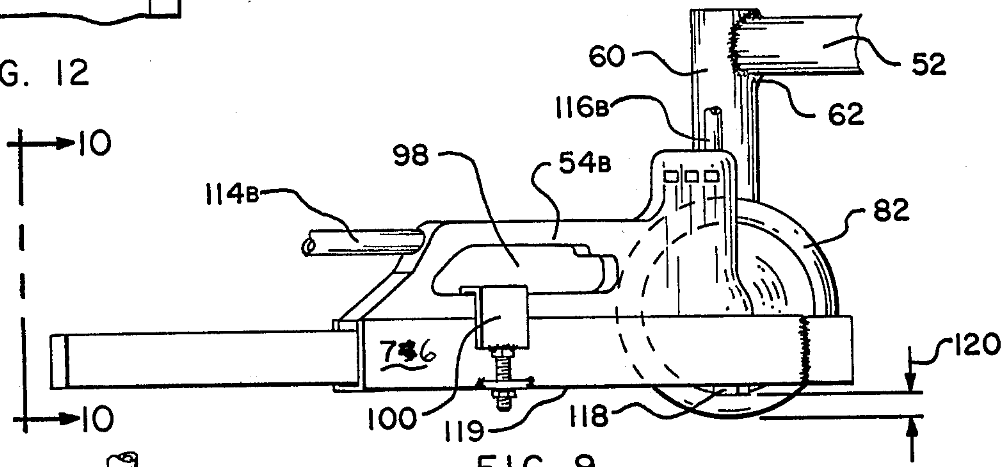
FIG. 9
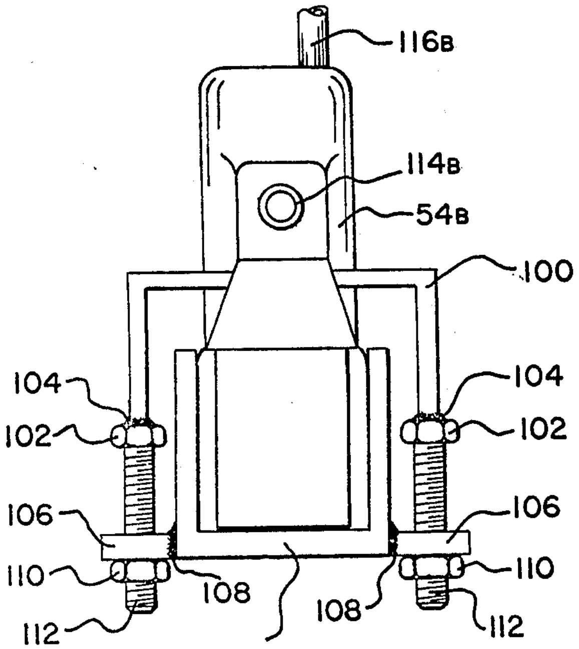
76 FIG. 10
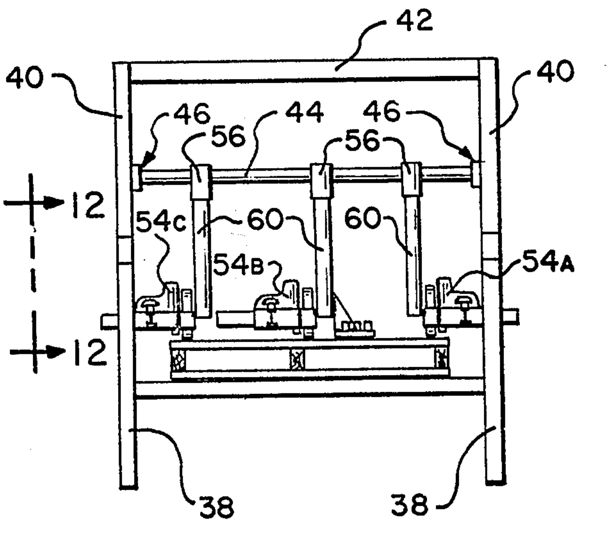
FIG. 11

MAIN MANIFOLD 156
VALVE MANIFOLD
EX.
EX.
EX.
N.O. MICROSWITCH
MICROSWITCH #86
ON DELAY
N.C. CONTACT
N.O. MICROSWITCH
MICROSWITCH #88
ON DELAY
N.C. CONTACT
N.O. MICROSWITCH
MICROSWITCH #90
ON DELAY
N.C. CONTACT
190
192
194
OFF
ON
120 VOLTS SINGLE PHASE
L1
L2
54A
54B
54C
116A
116B
116C
114A
114B
114C
82
154
158
160
162
172
170
200
198
196
212
184
206
210
204
208
202
182
180
168
166
164
186
40
49
46
51
217
44
52
213
50
55
59
57
48
215
38
148
144
150
152
142
146
128
138
129
134
130

METHOD FOR AUTOMATICALLY FASTENING DECK BOARDS TO STRINGERS

This is a division of application Serial No. 538,910 filed Jan. 6, 1975, now U.S. Pat. No. 3,957,191.

BACKGROUND OF THE INVENTION

This invention relates generally to a fastening system and more particularly to an automatically adjustable fastening system for use in fastening deck boards to stringers in a pallet-making machine or the like.

Fabricated transportation and storage pallets may be constructed by fastening a plurality of deck boards to the top and bottom of a plurality of stringers. These stringers may be of the type generally known as solid stringers or of the type generally known as fabricated or block stringers and heretofore the completed pallet has been generally assembled and fastened entirely with manual labor using only pneumatic fastening devices, such as staple guns or nailing guns to complete the pallet.

Known prior art techniques have provided for the rapid fastening of the components of the pallet but did not provide means for automatically supplying and positioning the article components prior to the fastening station which is essential if the completed articles are to be efficiently assembled. In order to overcome the problems inherent in the prior art assembling machines, there was provided by the applicant's U.S. Pat. No. 3,755,871, issued Sept. 4, 1973, a new and unique pallet assembling machine which could be used to automatically construct a partial pallet of either the fabricated block-type or of the stringer-type. When the machine of the cited patent was combined with a similar machine, the two units could be used to automatically assemble the completed pallet.

The applicant's unique pallet assembling machine typified in the U.S. Pat. No. 3,755,871, comprised basically an automatic bulk stringer supply and feeder used in combination with an automatic deck board supply and unscrambler which was located above the stringer supply. These two supply members were interconnected in such a manner that the components could be accurately positioned together for manual and for automatic nailing or stapling to thereby provide a partial pallet which when turned over was introduced into a similar second pallet assembler to form the completed pallet.

When the subject pallet machine was completed it was found that manual fastening of the deck boards to the stringers was not entirely satisfactory since labor was expensive and the use of manual labor did not always result in a uniformly formed pallet. Attempts to automate the fastening portion of the automatic pallet machine required the use of new and novel fastening techniques inasmuch as the applicant's automatic pallet machine was a continuous machine as opposed to the prior art intermittent machine wherein a plurality of automatic fasteners could be moved into position as the pallet passed through the assembling station and was intermittently stopped beneath the fasteners.

The use of fixed staplers or nail guns could not be relied upon in a continuous system since the act of stapling or nailing could tend to disorient the position of the unfastened deck boards that had been placed on the stringers prior to being fastened. That is to say the shock of fixed stapling or nailing could move the oncoming unfastened deck boards out of their predetermined position resulting in a poor appearing and structurally unsound pallet.

Prior art fixed fastening stations or devices are typified by the following United States Patents which show various fastening methods wherein either the staple or nail gun is held in a fixed position or else is movable into position on the product or the product is movable to a fixed staple or nail gun:

| Patent Number | Inventor | Issue Data |
|---|---|---|
| No. 3,774,833 | Deshich | November 27, 1973 |
| No. 3,557,439 | Dykeman | January 26, 1971 |
| No. 913,958 | Inwood | March 2, 1909 |
| No. 1,949,108 | Paxton | February 27, 1934 |
| No. 1,959,839 | Paxton | May 22, 1934 |
| No. 2,884,637 | Wandel | May 5, 1959 |
| No. 3,261,527 | Sterner | July 19, 1966 |
| No. 3,591,067 | Vial | July 6, 1971 |
| No. 3,717,924 | Kennedy | February 27, 1973 |

SUMMARY OF THE INVENTION

In order to overcome the problems inherent in the prior art type of devices and in order to provide an automatic fastening system for the applicant's automatic pallet-making machine, there is provided by the subject invention an automatically adjustable fastening station for use in fastening deck boards to stringers in a continuous pallet-making machine which comprises a plurality of staple or nail guns which are pivotably mounted on an adjustable frame with the staple or nail guns being set in a wheel-mounted frame, the fastening structure and wheel mounting being counter-weighed a predetermined amount so that a given force may be applied by the wheel to hold the deck board being fastened in a fixed position thereby resulting in a more precisely fastened deck board on the stringer of the pallet. Also disclosed is an automatic firing pneumatic circuit for fastening articles at the fastening station which utilizes the plurality of wheel-mounted, air-operated staple or nail guns in combination with a plurality of staple or nail gun-mounted control means in the form of microswitches to automatically and sequentially fire the staple or nail guns as the deck boards pass continuously beneath the pivotablymounted fastening guns.

Accordingly it is an object of the invention to provide a new and novel fastening station for use in a pallet assembling machine of the continuous type wherein a plurality of various sized pallet structures may be automatically fastened without requiring time-consuming adjustments of the pallet machine to fit the various size pallet structures.

Another object of the invention is to provide a new and novel automatic fastening station for use in a pallet assembling machine having various adjustable features which allow the pallet structures to be automatically stapled or nailed by the use of pivotably-mounted, wheel-positioned fastener guns in combination with a new and novel pneumatic circuitry which automatically staples or nails the various parts together.

Yet another object of the invention is to provide a plurality of wheel-mounted staple or nail guns which may be vertically raised and lowered automatically and which are utilized to hold the deck board being stapled or nailed in place while it is automatically stapled or nailed, the mounting wheel serving to absorb the shock caused by the fastening guns being fired.

Still yet another object of the invention is to provide a new and novel automatic fastening system which may be used to automatically staple or nail deck boards on pallets that are continuously formed and that does not require a stoppage in the assembly line for the purpose of stapling or nailing.

Another object and advantage of the invention is to provide an automatic fastening station that allows pallets to be more quickly and easily formed than has been heretofore possible with prior art pallet assembling machines.

These and other objects and advantages of the invention will become apparent from a review of the drawings and from a reading of the description of the preferred embodiment.

BRIEF DESCRIPTION OF THE DRAWINGS

FIG. 2 is a side view of a half-completed stringer-type pallet;

FIG. 3 is a side view of a completely fabricated stringer-type pallet;

FIG. 4 is a side view of a half-completed, block-type pallet;

FIG. 5 is a side view of a completely fabricated block-type pallet;

FIG. 9 is an enlarged side sectional view taken along line 9—9 of FIG. 7;

FIG. 10 is an end view taken along line 10—10 of FIG. 9 showing the mounting of the staple gun;

FIG. 11 is an end view taken along line 11—11 of FIG. 1;

FIG. 12 is a partial side view taken along line 12—12 of FIG. 11;

DESCRIPTION OF THE PREFERRED EMBODIMENT

Figure 1:
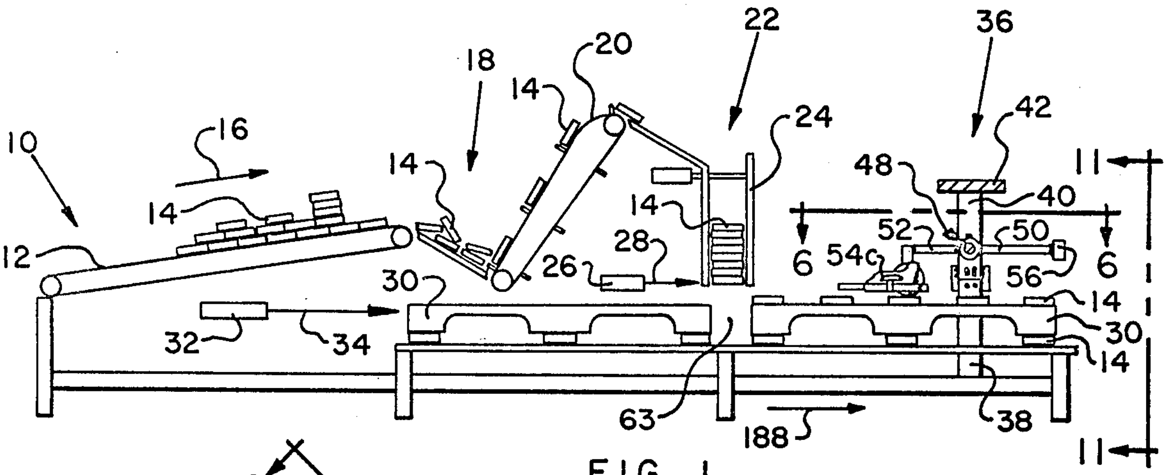
FIG. 1 is a simplified side view showing an automatic pallet-making machine and showing the relative location of the applicant's automatically adjustable fastening station in that machine.

Referring now to the drawings in general and in particular to FIG. 1 of the drawings there is shown an automatic pallet assembling machine generally by the numeral 10, of the type taught in my U.S. Pat. No. 3,755,871, issued Sept. 4, 1973. The pallet machine shown in FIG. 1 of this drawing is similar to that portion of the pallet machine shown in FIG. 6 of the beforementioned patent and is also similar to that portion of the pallet machine shown in FIG. 4 of the patent. The automatic pallet machine forms no portion of the subject invention but is shown only for purposes of giving the reader a clearer understanding of the background of the subject invention and to enable the reader to have a more comprehensive understanding of the applicant's new and novel automatic fastening station which may be utilized with that continuous type machine and others.

The automatic pallet assembling machine hereinbefore described comprises generally a first deck board conveyor 12 having a plurality of deck boards 14 placed thereupon and which are moving uphill in a direction shown by the arrow 16. The deck boards 14 then fall into a first deck board hopper, shown generally by the arrow 18, and are unscrambled as they continue to move uphill on a second deck board conveyor 20. The deck boards 14 then pass to a second deck board hopper, shown generally by the numeral 22, where they are stacked in a uniform manner in the hopper 24 to be ejected by means of the power cylinder 26 in combination with the power rod 28 as is more fully described in the U.S. Pat. No. 3,755,871. The pallet stringers 30 or partial pallets are then positioned underneath the hopper 24 by means of the cylinder 32 in combination with the power rod 34. As the stringers 30 or partial pallets pass beneath the hopper 24, a plurality of deck boards 14 are positioned at the proper location on the stringer or partial pallet prior to being stapled or nailed in place.

Prior to the conception of the applicant's subject invention, the stapling or nailing of the deck boards to the stringers or partial pallet was completed at a fastening station, shown generally by the numeral 36, with the staples or nails being applied by manual labor using hand-held fastening guns. Such fastening, while satisfactory during the initial development of the automatic pallet machine, did not prove successful in the long run due to the high cost of manual labor and the nonuniformity of the application of the fasteners in the pallet. That is to say it has been found by experimentation that, when using staples for example, it is preferable to place the staple in the deck board at an approximate 45° angle with the grain of the stringer 30 which runs along the length of the stringer member. It has been found that when staples are placed with the grain or other than at a 45° angle they tend to lose their holding power while when they are placed at the approximate 45° angle, they tend to have far greater holding power thereby resulting in a much improved pallet.

Prior known automatic fastening devices generally comprise intermittent motion as opposed to continuous motion which means that the pallet to be stapled or nailed was positioned in the fastening section and was stopped while the fastening was accomplished. From a study of the applicant's automatic pallet machine shown in FIG. 1 it can be seen that it is preferable to provide a fastening station that can be utilized for continuous motion, that is to say one in which the pallets pass through the fastening station without being delayed thereby resulting in a faster and more efficient automatic pallet machine.

In the design of the applicant's new and novel fastening station, problems soon presented themselves in that variations in the height of the pallet structures passing through the fastening station negated the use of known fastener mountings. By referring to FIGS. 2 through 5 of the drawings there are shown four different pallet structures that may pass through the fastening section of an automatic pallet machine and which would have to be stapled or nailed in place in order to form a partial or completed pallet. Automatic stapling or nailing may be required at the same fastening station for the partial stringer pallet shown in FIG. 2 and then later for the partial block-type pallet shown in FIG. 4, while another automatic fastening station may be required to staple or nail the completed stringer-type pallet shown in FIG. 3 of the drawing and at a later time to staple or nail the completed block-type pallet shown in FIG. 5 of the drawing.

By referring to the table shown below which refers to the letter dimensions shown in FIGS. 2–5, it can be seen how the height of the various pallet structures varies and it should become apparent that prior known fixed fastening devices would not be adequate to handle the great variations in the height of the pallet structures passing beneath the fastener:

| Dimension | Variation (inches) |
|---|---|
| A | ½" - ¾" |
| B | 3¼" - 4" |
| C | 2" - 4" |
| D | 3¾" - 4¾" |
| E | 4¼" - 5½" |
| F | 3½" - 6¼" |
| G | 4" - 7" |

Figure 6:
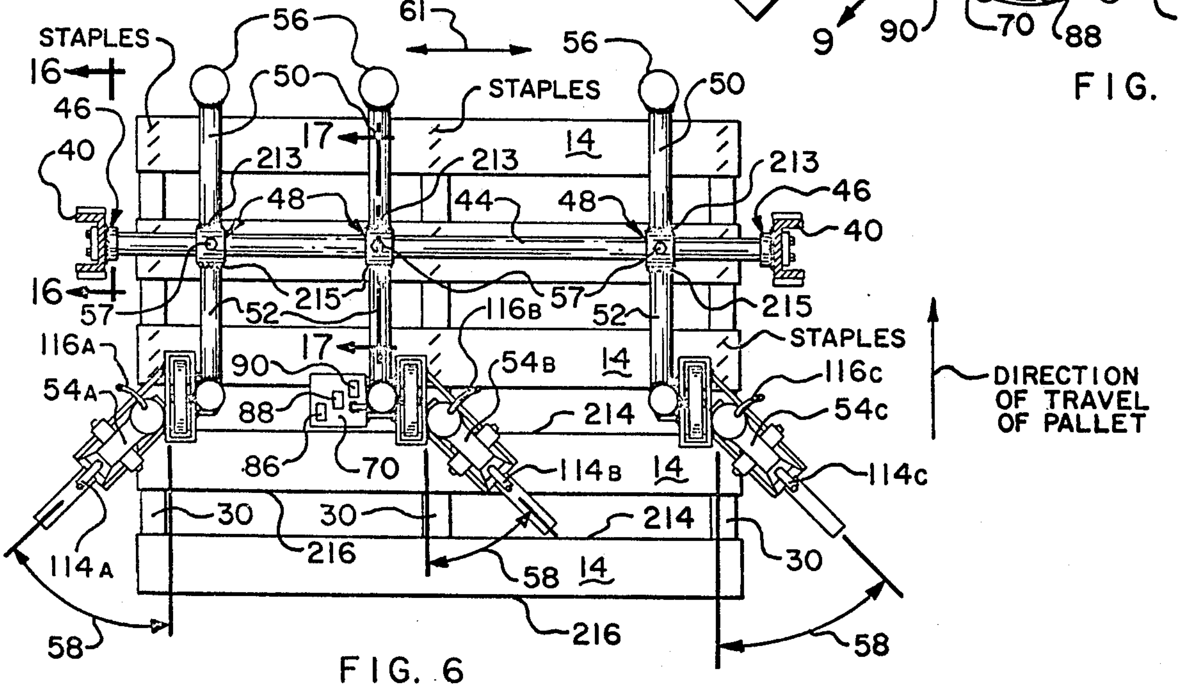
FIG. 6 is a top sectional view taken along line 6—6 of FIG. 1 showing the mounting of the staple guns in the applicant's preferred embodiment.

Referring now to FIGS. 6–12 and in particular to FIG. 1 and to FIG. 6, there is shown in greater detail the applicant's new and novel automatically adjustable fastening station as used with staple guns and which comprises a generally upstanding frame 38 having an upper adjustable portion 40 fixedly attached to a horizontal frame 42. Fixedly attached to the upper adjustable portions 40 and positioned below the generally horizontal frame 42 is a horizontal pipe shaft 44 which may be held at each end in a bearing collar 46 which is in turn welded to the upper portions 40. Pivotably mounted on the horizontal pipe shaft 44 by means of the split collars 48 are a plurality of generally horizontal pipes 50 and 52, the latter pipes 52 serving as a means for supporting the plurality of staple guns **54*a*, 54*b* and 54*c* which are utilized to staple the deck boards 14 onto the stringers 30. The plurality of pipes 50 are positioned on the opposite side of the horizontal pipes 52 and are fixedly attached to a counterweight 56 which serves as a means for counterweighting the combined weights of the various staple guns on the frame member. The counterweighting of the staple guns also prevents them from dropping into the space 63** between the approaching pallets.

It should be noted that the staple guns **54*a*, 54*b* and 54*c* are positioned at the angle, shown by the numeral 58, of approximately 45° to the grain of the stringers 30** which runs along the length of the stringer member.

Figure 7:
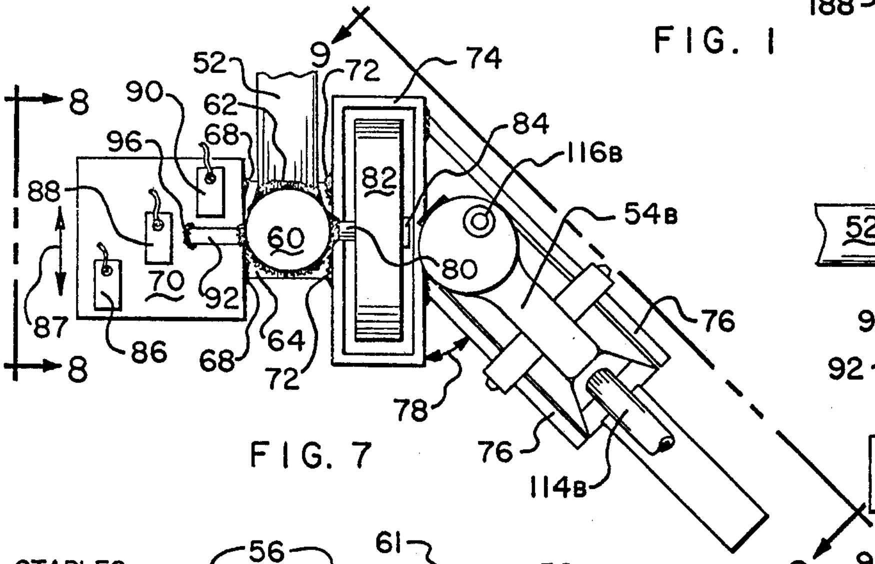
FIG. 7 is an enlarged top sectional view of the center staple gun shown in FIG. 6 of the drawing.
Figure 8:
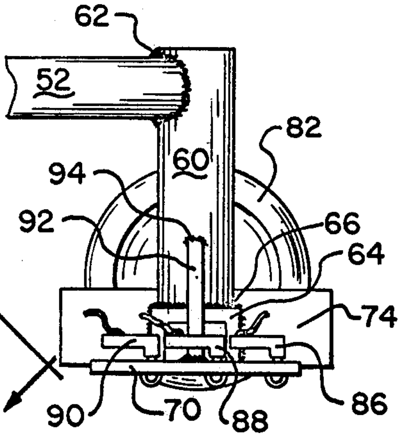
FIG. 8 is an enlarged side view taken along line 8—8 of FIG. 7.

Referring now to FIGS. 1 and 8, there is shown in more detail the mounting of the staplers and the means for positioning the staple guns so that they automatically raise and lower as the height of the pallet deck board changes as has been hereinbefore described. FIG. 7 is an enlarged top sectional view of the center staple gun **54*b* shown in FIG. 6 of the drawing and FIG. 8 is an enlarged side view taken along line 8—8 of FIG. 7. The horizontal pipe 52 is fixedly attached to an upstanding pipe 60 by means of a welded connection 62. At the lower end of the pipe 60 is a generally U-shaped frame 64 which is fixedly attached to the pipe 60 by means of the welded connection 66. The U-shaped frame 64 is in turn welded, by means of the weld 68, to a horizontal flat plate 70 and is also welded, by means of the weld 72, to a generally rectangular shaped upstanding box-like frame 74** which is open at its top and bottom edges.

Rigidly mounted to the rectangular shaped frame 74 is a generally U-shaped horizontal frame 76 which serves as a means for supporting the stapler **54*b* in the frame. The frame 76 is positioned at the angle, shown by the numeral 78**, of approximately 45°, as has been hereinbefore mentioned.

Fixedly attached to the upstanding pipe 60 and horizontally mounted thereto is an axle 80 upon which is rotatably mounted a wheel 82 which is held in place by the nut 84. The wheel 82 may be a pneumatic tire or a solid rubber tire or may also be a steel wheel having a rubber rim which aids in absorbing stapling shocks encountered in the fastening operation as the pallets pass beneath the fastening station.

Positioned and mounted on the flat plate 70, are the triggering means for triggering the respective staplers which are in the form of a plurality of microswitches 86, 88 and 90 whose function will be described more fully hereinafter when referring to the pneumatic circuit diagram for the stapling operation. The elongated flat plate 70 is also supported at its midportion by a generally L-shaped frame 92 which is welded at its upper end, by means of the weld 94, to the pipe 60 and is welded at its lower end, by means of the weld 96, to the central portion of the flat plate 70. The microswitches 86, 88 and 90 are mounted by well known means so that they may be adjustable in the direction shown by the arrow 87.

Referring now to FIGS. 9 and 10, there is shown how the pneumatic stapler **54*b* is positioned within the horizontal U-shaped frame 76 and how it is rigidly fastened thereto to prevent an upward motion of the stapler upon firing of the staple gun by a pneumatic source. Positioned within the handle opening 98 of the staple gun 54*b* is a U-shaped frame 100 which has welded on each end thereof, a bolt 102 by means of the weld 104. Positioned on the bottom portion of the U-shaped frame 76 are a pair of generally horizontal plates 106 which are welded, by means of the weld 108, to the frame 76. A pair of nuts 110 are then utilized to tighten on the thread 112 of the bolts 102 and to tightly draw the staple gun 54*b* into the frame 76**.

The staple guns **54*a*, 54*b* and 54*c* are of the type well known in the trade and contain a pneumatic firing connection 114*a*, 114*b* or 114*c* and have formed thereon a pneumatic triggering connection which will be described more fully hereinafter. A pneumatic firing connection is a connection on the staple gun through which firing air from a main manifold passes into the staple gun to fire the gun. A pneumatic triggering connection is a connection on the staple gun through which triggering air from a valve manifold passes into the staple gun to trigger the firing of the gun by the firing air. By referring to FIGS. 7 and 9 of the drawings, it can be readily seen that since the frame 74 is welded to the frame 72 which is in turn welded to the upstanding pipe 60 which also has mounted thereon the wheel 82, that the distance from the tip 118 of the staple gun to the bottom of the wheel 82, shown by the numeral 120, is fixed regardless of the variations in the height of the pallet passing through the stapling station. It has been found from experimentation that the distance 120** is preferably approximately one-eighth of an inch which is sufficient to keep the staple gun from coming in contact with the deck board passing below it while still permitting the staple to be driven flush with the boards and acts to prevent the staple from malfunctioning by hanging up in the deck board. When the distance 120 is substantially greater than one-eighth of an inch, the malfunction will occur by the staple not being driven flush with the boards and will hang up or not have enough force imparted to it by the staple gun to drive it completely flush with the boards. It is preferable to keep the bottom 119 of the stapler approximately parallel to the face of the pallet passing beneath the stapler. Since the staple gun is mounted in the frame 76 it then becomes apparent that the staple guns automatically ride up and down on the deck boards by means of the wheels 82 as the deck boards may vary in height as has been before mentioned. The deck boards may also vary in height due to individual warpage. The wheels in this case then also serve to hold the deck boards down while the staples are being driven into the deck boards and also the rubber tires of the wheels 82 tend to absorb stapling shocks caused by the penumatic stapling of the deck boards to the stringers.

Figures 13, 14, 15, 16, 17:
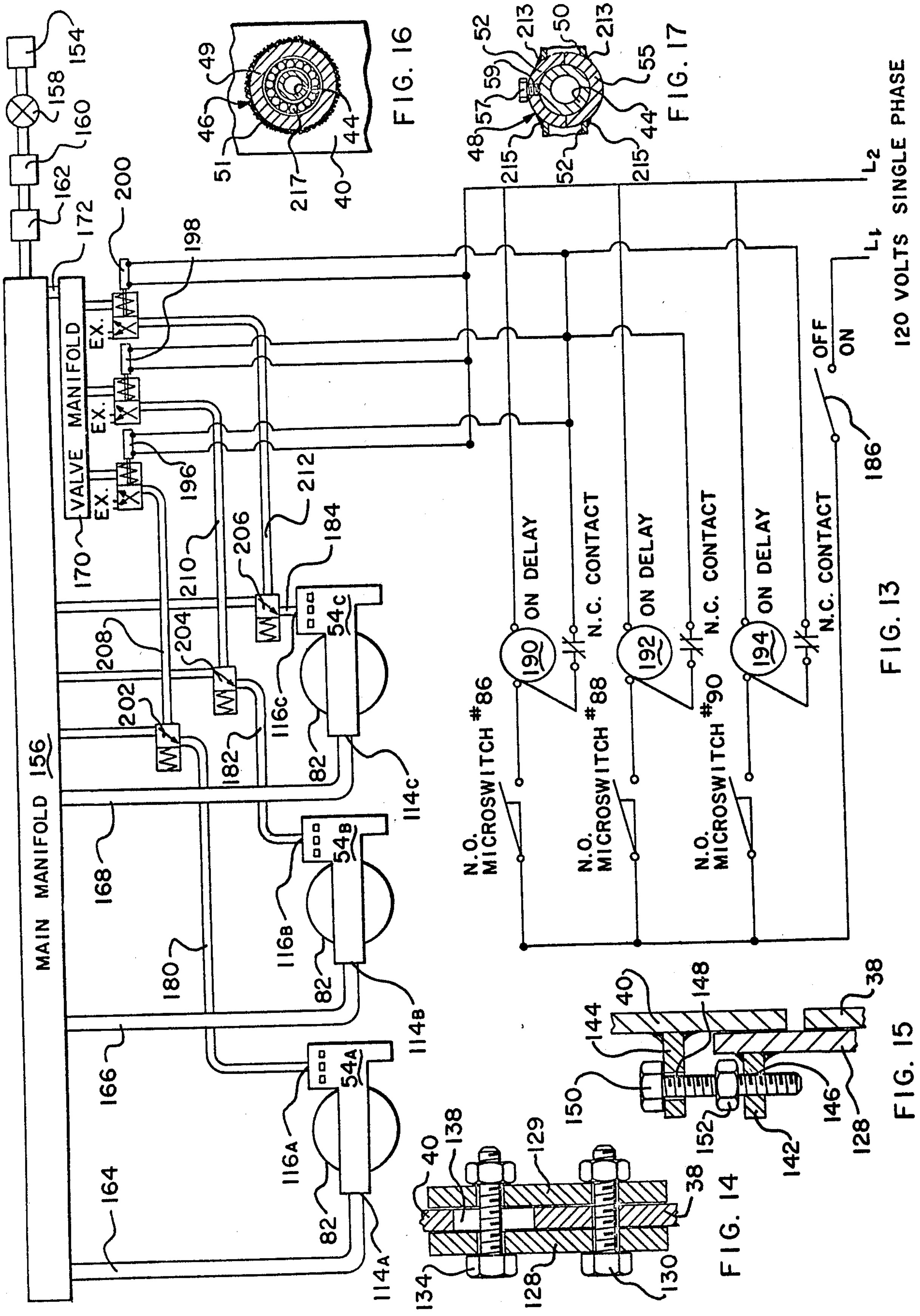
FIG. 13 is a schematic of the pneumatic and electrical circuitry utilized for firing the staple gun.
FIG. 14 is a sectional view taken along line 14—14 of FIG. 12.
FIG. 15 is a sectional view taken along line 15—15 of FIG. 12.
FIG. 16 is a sectional view taken along lines 16—16 of FIG. 6.
FIG. 17 is a sectional view taken along lines 17—17 of FIG. 6.

By referring now to FIGS. 6, 16 and 17 it will be seen how the staple guns are pivotably mounted on the pipe shaft 44. FIG. 16 is a view taken along lines 16—16 of FIG. 6 and shows in detail the pivotable mounting of the pipe shaft 44 to the upper portion 40. The bearing 46 comprises a bearing collar 49 which is welded, by means of the weld 51, to the upper portion 40. Positioned inside the bearing collar 49 is a bearing 217 which may be a roller bearing or other types well known in the art. The pipe shaft 44 is then positioned inside the bearing 217 thereby allowing it to rotate or pivot within the bearing.

By referring to FIG. 17 there is shown the mounting of the staple guns on the pipe shaft 44. A split collar, shown generally by the numeral 48, comprises an upper portion 52 and a lower portion 55 which are welded to the pipes 50 and 52. The split collar 48 is welded to the pipe 50 by means of the weld 213 while it is welded to the pipe 52 by means of the weld 215. Positioned within the split collar 48 is the pipe shaft 44 which is rigidly held attached thereto by means of the set screw 57. The set screw 57 is positioned in a drilled and tapped hole 59 formed in the upper portion 52 of the split collar 48. Each of the staple guns 54*a*, 54*b* and 54*c* would be thusly mounted and retained on the pipe shaft 44 by the means of the set screws 57. As a result the staple guns are adjustable in the direction shown by the arrow 61 in FIG. 6 allowing them to be repositioned according to the width of the pallet to be stapled.

Referring now to FIGS. 11, 12, 14 and 15 of the drawing, there is shown a mechanical means for adjusting the height of the individual staplers whenever it is desirous to convert the pallet machine from manufacturing block-type pallets shown in FIGS. 4 and 5 to the stringer-type pallets shown in FIGS. 2 and 3. The upper portion 40, as well as the frame 42, is adjustable vertically in respect to the frames 38 as is shown more fully in FIG. 12 of the drawing. The upper portion 40 has welded thereto, by means of the weld 122, a pair of plates 124 and 126 on each side thereof. The plates 124 and 126 extend over the upstanding portion of the frames 38 and allow for vertical adjustment of the respective frames. Positioned on both sides of the upper portion 40 is a plate 128 and a plate 129 which are bolted at their lower ends, by means of the bolts 130 and 132, to the frame 38. Positioned in the upper portion of the plates 128 and 129 are a pair of bolts 134 and 136 which are positioned in a pair of elongated holes 138 and 140 formed in the lower portion of the upper portion frame 40.

In order to provide easy positioning of the frame 38 in respect to the upper portion 40, there is welded, to the plate 128, a plate 142 while there is welded to the upper portion 40, a plate 144. The plate 142 has a drilled and tapped hole 146, shown more fully in FIG. 15 of the drawing, while plate 144 has a drilled hole 148 sized to receive a bolt 150 which is positioned therein. Positioned between the plate 142 and the plate 144 is a nut 152 which serves as a locknut for tightening and holding the bolt 150 in place. From this it can be seen that whenever it is desired to raise the upper portion 40 upwardly or downwardly a predetermined amount, then a simple turning of the bolt 150 will achieve the desired result with the locknut 152 then being tightened against the bottom portion of the plate 144 to lock the upper portion 40 in respect to the frame 38.

Referring now to FIG. 13 of the drawing, there is shown the automatic firing pneumatic circuit for the stapling station which comprises the three independently mounted air-operated staple guns 54*a*, 54*b* and 54*c* which are wheel-supported, by means of the wheels 82, over the deck boards and pallet stringers which may be either the solid type or the prefabricated type. The staple guns are of the type that are normally manually fired with a manual trigger when connected to a primary air source, however the staple guns' firing mechanism has been modified in order that a charge of remotely supplied air can be used to automatically fire each individual staple gun or all of the staple guns. The staple guns have been modified by eliminating the manual trigger and replacing it with an automatic penumatic triggering connection 116*a*, 116*b* and 116*c* on the respective staple guns 54*a*, 54*b* and 54*c*. The triggering connection 116*a*, 116*b* and 116*c* are connected to the pressure lines 180, 182 and 184 and to the automatic firing circuit as will be more fully detailed hereinafter. The staple guns may be Senco Model M-I and M-II as manufactured by Senco Products, Inc. An electrical signal is used to control the charge of air to each gun-firing mechanism and at all times the staple guns are either in a firing or static cycle.

STATIC CYCLE

An air source 154 is supplied to the main manifold 156 with the source of air being pressure regulated by means of a pressure regulator 158. The air supply is also filtered for water, by means of the filter 160, and is oil injected, by means of the oil injector 162. The air pressure normally utilized is approximately 120 psig which is maintained in the main manifold 156 and to each of the pneumatic firing connections 114*a*, 114*b* and 114*c* by means of the air pressure lines 164, 166 and 168. This same air pressure is supplied to a valve manifold 170 through the pressure line 172 and to three normally open air-piloted valves 202, 204 and 206. Since these air valves are normally open, the main manifold air pressure is supplied to the pneumatic triggering connections 116*a*, 116*b* and 116*c* by means of the pressure line 180, 182 and 184. This pressure then keeps the stapler firing piston in the non-fired position and the stapler exhaust valve closed which prevents the stapler from being fired.

Referring now to the electrical portion of the circuit, single phase, 120 volt AC current is the primary line voltage L-1 and L-2 which is supplied to an on/off switch 186 and to all electrical circuits whenever the on/off switch 186 is in a closed position. At this point, the three microswitches 86, 88 and 90 are in a normally opened position keeping all electrical circuits open.

FIRING CYCLE

When the automatic pallet assembler stringer conveyor motor is started, the stringers and free-standing deck boards, which have been previously positioned on top of the three stringers (as taught by the U.S. Pat. No. 3,755,871), move in the direction shown by the arrow 188 in FIG. 1 of the drawing, to the automatic stapling station 36. As these prepositioned pallet parts approach the automatic stapling station 36 they first come into contact with the wheels 82 mounted with each staple gun. As before mentioned, the wheels 82 serve the following purposes:

1. They serve to support the staple guns and to maintain the staple guns' nose a predetermined distance above the moving deck boards. This predetermined distance is the distance 120 shown in FIG. 9 of the drawings;
2. They also keep the staple guns from coming into contact with the deck boards and disturbing their location on the moving stringers;
3. They also hold the deck boards on the stringers by the frictional contact and force of the wheel surface on the deck boards so that as the leading edge 214 of the unstapled deck board comes into contact with the respective microswitches 86, 88 and 90, the unstapled deck boards are not moved from their pre-set location on the moving stringers. As has been before described, the staple guns and wheels are counterweighted a predetermined amount so that a given predetermined force may be applied by the wheel to hold the deck board being fastened in a fixed position. The amount of counterweight and the resultant downward force by the wheel can be easily determined in the field by experimentation for the different types of wooden boards and pallet structures being created.

In order to initiate the automatic fastening of the staple guns, air is supplied to the main manifold 156 and the on/off switch 186 is switched to the on position with the stringer conveyor motor (described in the U.S. Pat. No. 3,755,871) being started so that the stringers move in the direction shown by the arrow 188 of FIG. 1 of the drawing. As the stringers and unfastened deck boards approach the automatic stapling station 36, the wheels 82 come in contact with the deck boards and move the staple guns into firing position. The leading edge 214 of the unfastened deck boards comes into contact with the first normally opened microswitch 86, making a circuit through a time delay switch 190 energizing the 120-volt coils in the solenoid air valves 196, 198 and 200. These solenoid air valves are normally closed valves and are momentarily opened allowing air from the valve manifold 170 to pass through the three solenoid air valves and to enter the normally opened air-piloted valves 202, 204 and 206 by means of the pressure lines 208, 210 and 212. The air-piloted valves 202, 204 and 206 are then closed allowing the air, which holds all stapler exhaust valves closed, to escape to the exhaust through the stapler. By opening the stapler exhaust valves, the air pressure in the stapler housing through the pneumatic firing connections 114*a*, 114*b* and 114*c*, causes the staplers to discharge staples into the pallet parts. Within a fraction of a second, the time delay switch 190 breaks the circuits to the solenoid air valves 196, 198 and 200 closing these valves which in turn reopens the air-piloted valves 202, 204 and 206 allowing the main manifold air pressure to close the exhaust valves in the staplers 54*a*, 54*b* and 54*c*.

As the pallet parts continue to move in the direction shown by the arrow 188 in FIG. 1, the leading edge 214 of the deck board comes into contact with the normally opened mircoswitch 88, while the normally opened microswitch 86 is still in a closed position. By closing the normally opened microswitch 88, a circuit is made through the time delay switch 192 energizing the 120-volt coils in the solenoid air valves 196, 198 and 200 which repeats the beforementioned sequence to momentarily fire the staplers 54*a*, 54*b* and 54*c* a second time.

As the pallet parts continue to move in the direction shown by the arrow 188 in FIG. 1, the leading edge 214 of the deck board comes into contact with the normally opened microswitch 90, with the normally opened microswitch 86 and the normally opened microswitch 88 still being in a closed position. By closing the normally opened microswitch 90, a circuit is made through the time delay switch 194 energizing the 120-volt coils in the solenoid air valves 196, 198 and 200 again repeating the beforementioned sequence to fire the staple guns 54*a*, 54*b* and 54*c* a third time thereby placing three staples in each deck board at each stringer, as is shown more fully in FIG. 6 of the drawing.

At this point, three fasteners have been driven into each deck board securing the deck board to the three stringers. As the pallet parts continue to move in the direction shown by the arrow 188 in FIG. 1, the normally opened microswitches 86, 88 and 90 leave the trailing edge 216 of the deck board and return to their normally opened position, returning the stapling system to a static cycle. Thereafter the firing cycle repeats itself with the passing of each deck board under the normally opened microswitches 86, 88 and 90.

By providing for adjustment of the microswitches in the direction shown by the arrow 87 in FIG. 7, it is possible to vary the location of each staple to meet the particular need of the respective pallets. It should be apparent that more or less than three staples may be desired in which case the number of microswitches would be varied along with changes made in the pneumatic circuit to achieve the desired results.

It should also be apparent that other means may be developed for firing the staple guns in place of the before described microswitch controlled pneumatic circuit. For example, the microswitches could be replaced with photoelectric cells and changes could be made in the pneumatic circuit to accomplish the firing without departing from the spirit and scope of the invention.

From the foregoing it can be seen that there has been provided by the subject invention a new and novel automatic stapling system and method which accomplishes all of the stated objects of the invention. While only certain forms of the present invention are shown and described herein in detail, other forms and modifications are possible and changes may be made in the arrangement and combination of the parts of the invention and steps of the method and in the detailed structure without departing from the spirit and scope of the invention as defined in the claims herein appended.

Having described the invention, I claim:

1. A method for automatically fastening a plurality of deck boards to a plurality of stringers, comprising the steps of:

a. providing a counterweighted pivotably mounted fastener gun above each stringer;

b. providing a positioning means on each said fastener gun to automatically raise and lower the position of said fastener gun as the height of the deck board varies, each said counterweight serving to counterweight the combined weight of each fastener gun and each positioning means;

c. providing an automatic firing means for said fastener guns;

d. providing said firing means with a plurality of automatic switch means, responsive to the forward motion of the deck boards, for automatically firing said fastener guns as said deck boards pass in contact with said automatic switch means;

e. positioning the plurality of stringers and deck boards beneath the counterweighted fastener guns; and f. firing the fastener guns by means of the automatic switch means being activated by the forward motion of the deck boards.

2. The method as defined in claim 1 wherein said automatic switch means comprise a plurality of microswitches.

3. The method as defined in claim 2 wherein said microswitches are three in number and are adjustably mounted on one of said positioning means.

4. The method as defined in claim 1 wherein said automatic firing means comprises a pneumatic firing circuit.

5. The method as defined in claim 1 wherein said fastener guns are staple guns.

6. The method as defined in claim 1 wherein said fastener guns are nailing guns.

7. The method as defined in claim 5 wherein said fastener guns are positioned at 45° to the stringers.

8. A method for automatically fastening a plurality of deck boards to a plurality of stringers, comprising the steps of:

a. providing at least three counterweighted pivotably mounted fastener guns above the stringers;

b. providing each fastener gun with a rubber-covered rotatable wheel for positioning the fastener gun at a predetermined position above the deck boards, said rubber-covered wheel also serving to absorb fastening shocks encountered in the fastening operation;

c. providing an automatic firing circuit for said fastener guns, said firing circuit including a plurality of automatic switch means, responsive to the forward motion of the deck boards for automatically firing said fastener guns as said deck boards pass in contact with said automatic switch means;

d. positioning the plurality of stringers and deck boards beneath the counterweighted fastener guns; and e. firing the fastener guns by means of the automatic switch means being activated by the forward motion of the deck boards.

9. The method as defined in claim 8 wherein said automatic switch means comprise a plurality of microswitches.

10. The method as defined in claim 8 wherein said automatic firing circuit is a pneumatic circuit.

11. The method as defined in claim 8 wherein said fastener guns are staple guns.

12. The method as defined in claim 8 wherein said fastener guns are nailing guns.

* * * * *